(12) United States Patent
Sakuma

(10) Patent No.: US 7,054,956 B2
(45) Date of Patent: May 30, 2006

(54) MULTI-INTERVAL DATA ACQUISITION APPARATUS

(75) Inventor: Noriyuki Sakuma, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 195 days.

(21) Appl. No.: 10/644,861

(22) Filed: Aug. 21, 2003

(65) Prior Publication Data

US 2005/0251585 A1    Nov. 10, 2005

(30) Foreign Application Priority Data

Aug. 28, 2002   (JP) ............................ 2002-248395

(51) Int. Cl.
*G06F 3/00* (2006.01)

(52) U.S. Cl. .............................................. 710/5; 710/6

(58) Field of Classification Search .................... 710/5, 710/6, 20, 21
See application file for complete search history.

(56) References Cited

U.S. PATENT DOCUMENTS

| | | | | |
|---|---|---|---|---|
| 3,862,372 A | * | 1/1975 | Deutsch | 370/360 |
| 3,881,156 A | * | 4/1975 | Deutsch | 327/392 |
| 5,040,234 A | * | 8/1991 | Yamamoto et al. | 388/811 |
| 6,621,806 B1 | * | 9/2003 | Keller et al. | 370/329 |

FOREIGN PATENT DOCUMENTS

JP        7-253996        10/1995

* cited by examiner

*Primary Examiner*—Tammara Peyton
*Assistant Examiner*—David Martinez
(74) *Attorney, Agent, or Firm*—Westerman, Hattori, Daniels & Adrian, LLP

(57) ABSTRACT

The objective is to provide a data acquisition apparatus enabling simultaneous data acquisition using multiple measurement intervals in a data acquisition apparatus comprised of multiple input modules.

It is characterized, as a data acquisition apparatus comprising multiple input modules having different measurement intervals, in that a control means is provided for simultaneously driving each input module at a specified measurement interval.

This makes it possible to simultaneously acquire data using multiple measurement intervals which are optimal for each input module in a data acquisition apparatus comprised of multiple input modules.

6 Claims, 16 Drawing Sheets

FIG.4

| Measurement \ Input Module | 1st | 2nd | 3rd | 4th | 5th | 6th | 7th | 8th | 9th | 10th | 11th | 12th | 13th | 14th | 15th | 16th | 17th | 18th | 19th | 20th |
|---|---|---|---|---|---|---|---|---|---|---|---|---|---|---|---|---|---|---|---|---|
| 20 | 1 | 0 | 0 | 0 | 0 | 0 | 0 | 0 | 0 | 0 | 0 | 0 | 0 | 0 | 0 | 0 | 0 | 0 | 0 | 0 |
| 30 | 1 | 0 | 0 | 0 | 0 | 0 | 0 | 0 | 0 | 0 | 0 | 1 | 0 | 0 | 0 | 0 | 0 | 0 | 0 | 0 |
| 40 | 1 | 1 | 1 | 1 | 1 | 1 | 1 | 1 | 1 | 1 | 1 | 1 | 1 | 1 | 1 | 1 | 1 | 1 | 1 | 1 |

1 : A command is sent
0 : A command is not sent

MULTI-INTERVAL DATA ACQUISITION APPARATUS

BACKGROUND OF THE INVENTION

1. Field of the Invention

The present invention pertains to a multi-interval data acquisition apparatus, and more specifically, one that is designed to enable parallel measurement of measured data at multiple measurement points at measurement intervals which differ according to their respective measurement subjects.

2. Description of the Related Art

In the measurement of, for example, characteristics of a fuel cell system used in electric cars, one may consider simultaneous measurement of fuel cell temperature changes and fluctuations in fuel cell output terminal voltage when starting movement or accelerating, as well as fluctuations in voltage supplied to the various parts of the car's electrical system, and the like. In this case, a measurement interval of, for example, approximately 2 seconds may suffice for temperature changes because they are relatively smooth. However, a measurement interval of, for example, 0.1 second would be required for voltage fluctuations because they occur much more rapidly than do temperature changes, although they are affected by the size of the load's time constant.

Therefore, apparatuses with a configuration such as that shown in FIG. 1, for example, have been commercialized as such multi-point measurement data acquisition apparatuses. If the apparatus in FIG. 1 is considered as a large block, then it is comprised of a main unit 10, which controls the apparatus as a whole; and three input modules 20, 30 and 40 comprising A/D converters, to which respective analog input signals are input via a scanner.

These input modules 20, 30 and 40 have different measurement intervals—low speed, medium speed, and high speed. For example, input module 20 is drive-controlled so as to sequentially measure measurement channels CH1 through CH10 in 2-second measurement intervals. The input module 30 is drive-controlled so as to sequentially measure measurement channels CH11 through CH20 in 1-second measurement intervals. The input module 40 is drive-controlled so as to sequentially measure measurement channels CH21 through CH30 in 0.1-second measurement intervals.

In the main unit 10, the timer 11 manages the time relationships for the apparatus as a whole. In particular, it determines the measurement intervals and applies interrupts to the main control 12.

The main control 12 controls the apparatus as a whole. With respect to measurements, it sends a measurement start command via a command signal line 14 to each of the input modules 20, 30 and 40 according to interrupts from the timer 11; and when measurement ends, acquires measured data from the input modules 20, 30 and 40 via a module data arbitrator 15 and stores the data in the memory 13.

The command signal line 14 has a function for simultaneously sending commands to each of the input modules 20, 30 and 40, in addition to a function for sending with arbitration during command transmission.

The module data arbitrator 15 arbitrates data reception between the main control 12 and each of the input modules 20, 30 and 40. Specifically, it uses a bus line connection system or serial communication to arbitrate the timing of measured data sent from each of the input modules 20, 30 and 40 for sending to the main control 12.

In the input modules, such as in 20, a module control 21 controls the input module 20 as a whole. Specifically, when a measurement start command sent from the main control 12 is received, the module control 21 sends the switch selector 22 a signal for sequentially selecting and driving the switches SW01 through SW10 forming the scanner 23.

The switch selector 22 sequentially selects and drives the switches SW01 through SW10 forming the scanner 23, thereby sequentially and selectively inputting, to the A/D converter 24, the analog signals of each measurement channel CH1 through CH10. Herein, an integrating A/D converter 24, for example, is used.

The A/D converter 24 converts the analog signals input through the scanner 23 to digital signals, which are output to the module control 21 as measured data.

The operations in FIG. 1 will be described using the timing chart in FIG. 2.

The main control 12 simultaneously sends measurement start commands via the command signal line 14 to each of the input modules 20, 30 and 40 in accordance with interrupts from the timer 11.

The main controls of each of the input modules 20, 30 and 40 receiving the measurement start commands start measurement operations, and send their respective switch selectors signals for selecting and driving the lead switches SW01, SW11, and SW21 of the switches SW01 through SW10, SW11 through SW20, and SW21 through SW30 forming the respective scanners.

When the lead switches SW01, SW11, and SW21 of the individual scanners are selected and driven, the A/D converters of the input modules 20, 30 and 40 convert the analog signals of measurement channels CH1, CH11, and CH21 to digital signals, and the conversion results are output as measured data to the main controls of each of the input modules 20, 30 and 40.

The main controls of the input modules 20, 30 and 40 transfer the measured data to the main unit 10.

The module data arbitrator 15 of the main unit 10 arbitrates and receives the measured data sent from each of the input modules 20, 30 and 40, and transfers it to the main control 12.

The main control 12 saves the measured data to the memory 13. When measurement on measurement channels CH1, CH11, and CH21 ends, the switch selectors 22 of each of the input modules 20, 30 and 40 select and drive their second switches SWO2, SW12, and SW22 for measurement of measurement channels CH2, CH12, and CH22.

Subsequently, like processes are executed all the way through CH10. CH20, and CH30 to complete the series of measurements based on the first measurement start command.

Thereafter, when an interrupt from the timer 11 enters at a set measurement interval and a measurement start command is sent, the measurements from (1) through (8) are repeated in the same manner in that interval.

However, with this type of conventional configuration, measurement start commands are sent nearly simultaneously from the main unit 10 to each of the input modules 20, 30 and 40, thereby driving the input modules 20, 30 and 40 to acquire measured data in the same measurement interval.

Consequently, the measurement interval for the apparatus as a whole is the measurement interval of the input module 20 (2 seconds), which is the slowest of the three input modules 20, 30 and 40. This is problematic in that:

It is only possible to perform 2-second measurements, even though an input module 30 with a measurement interval of 1 second and a 0.1-second input module 40 are incorporated. Thus it is not possible to sufficiently realize their capabilities.

Measurements can only be performed at a single measurement interval in the apparatus as a whole, even though it incorporates input modules with multiple intervals.

SUMMARY OF THE INVENTION

The present invention solves these problems, and has the objective of providing a data acquisition apparatus comprised of multiple input modules, wherein said data acquisition apparatus enables simultaneous data acquisition apparatus using multiple measurement intervals.

In order to achieve this objective, the present invention is a data acquisition apparatus comprising multiple input modules having different measurement intervals, characterized in that a control means is provided to simultaneously drive each of the input modules at specified measurement intervals.

This makes it possible to perform simultaneous data acquisition using multiple measurement intervals which are optimal for each input modules, in a data acquisition apparatus comprised of multiple input modules.

BRIEF DESCRIPTION OF THE DRAWINGS

FIG. 4 is an explanatory diagram of the sequence for sending a measurement start command with the present invention.

DESCRIPTION OF THE PREFERRED EMBODIMENTS

Figure 3:
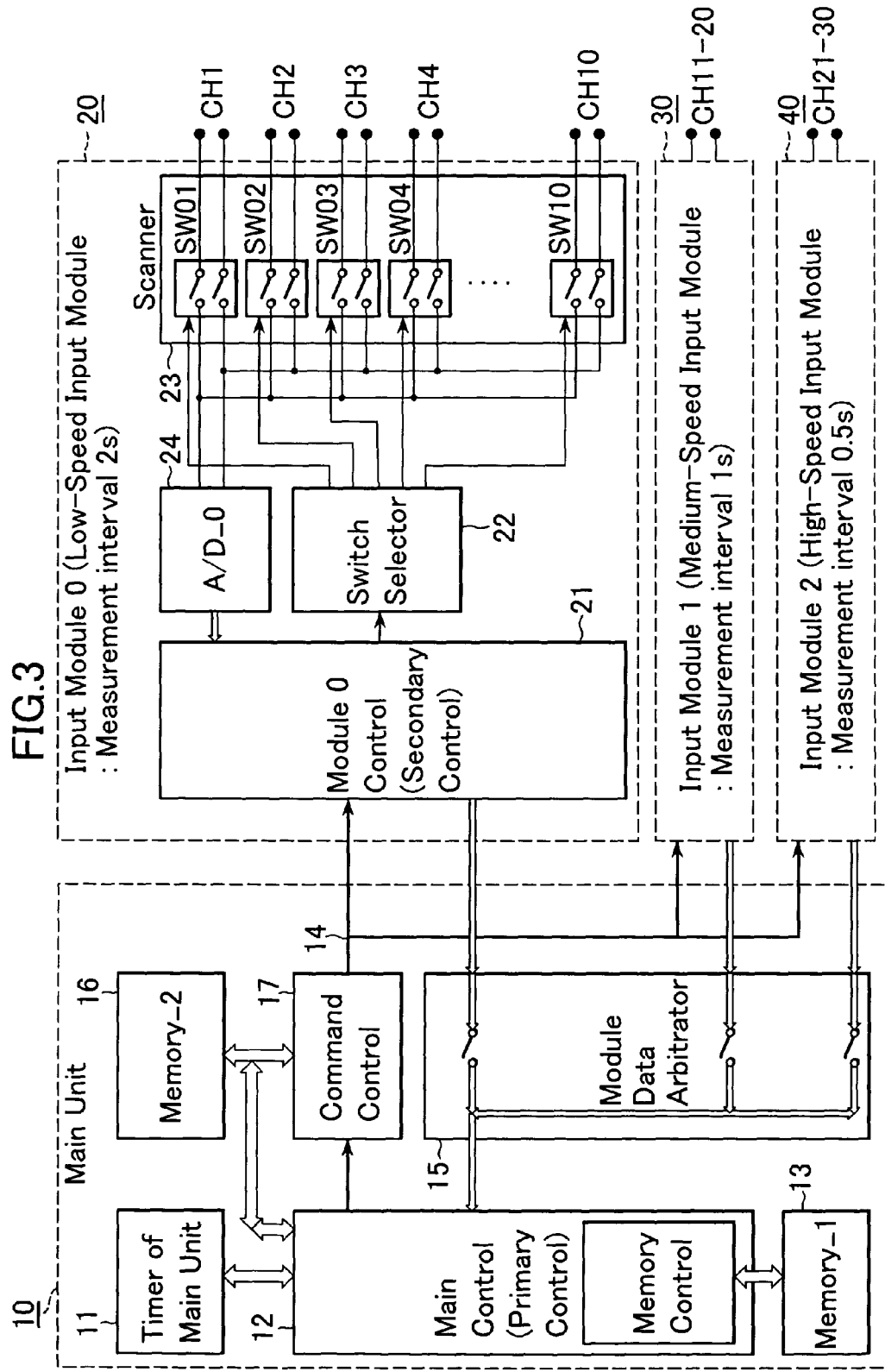
FIG. 3 is a block diagram illustrating an example of a preferred embodiment of the present invention.

Preferred embodiments are described below with respect to the drawings. FIG. 3 is a block diagram of a data acquisition apparatus illustrating an example of a preferred embodiment of the present invention. Parts which are the same as in FIG. 1 are denoted by the same numbers.

Figure 1:
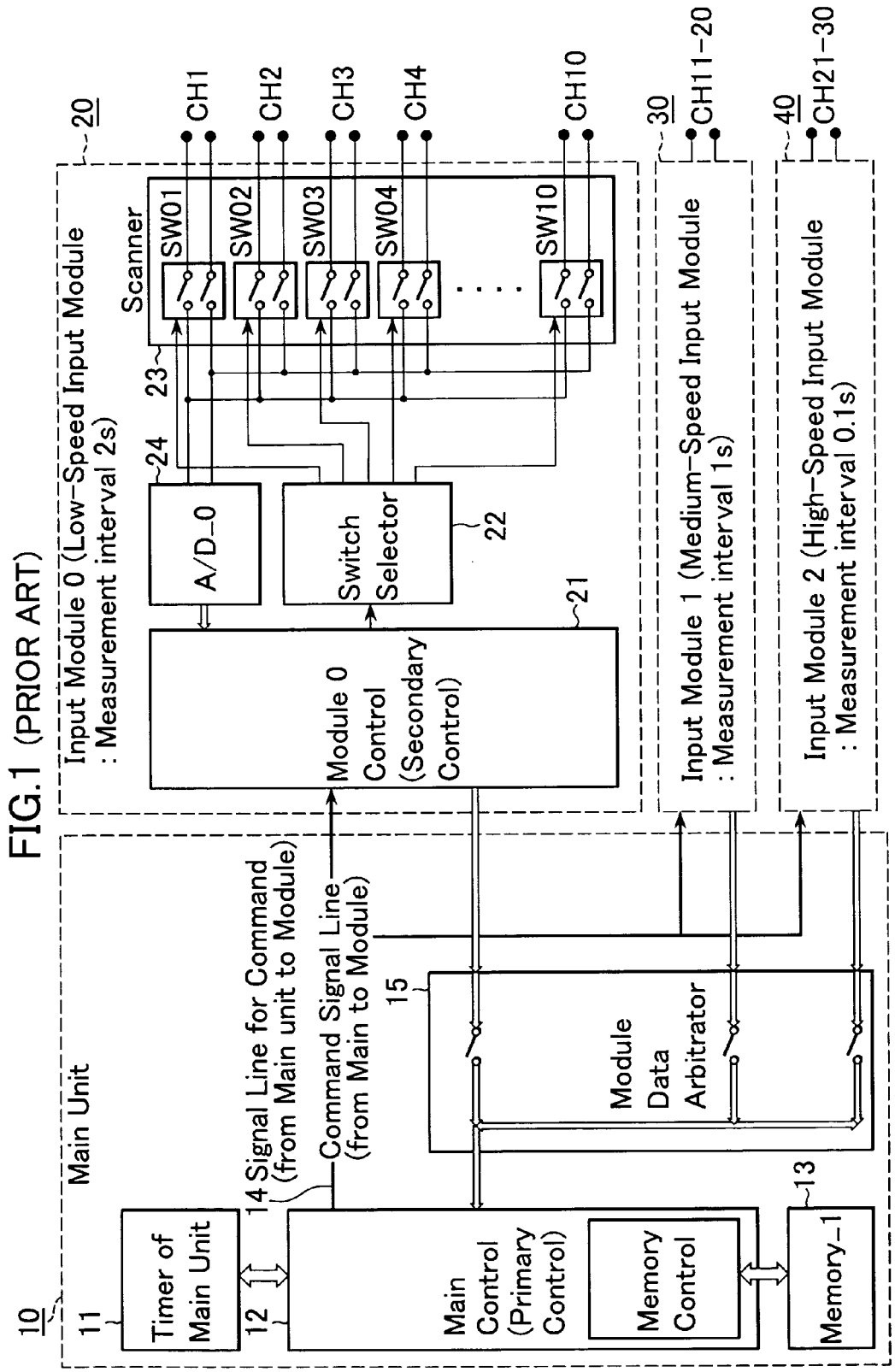
FIG. 1 is a block diagram illustrating an example of a conventional data acquisition apparatus.
Figure 2:
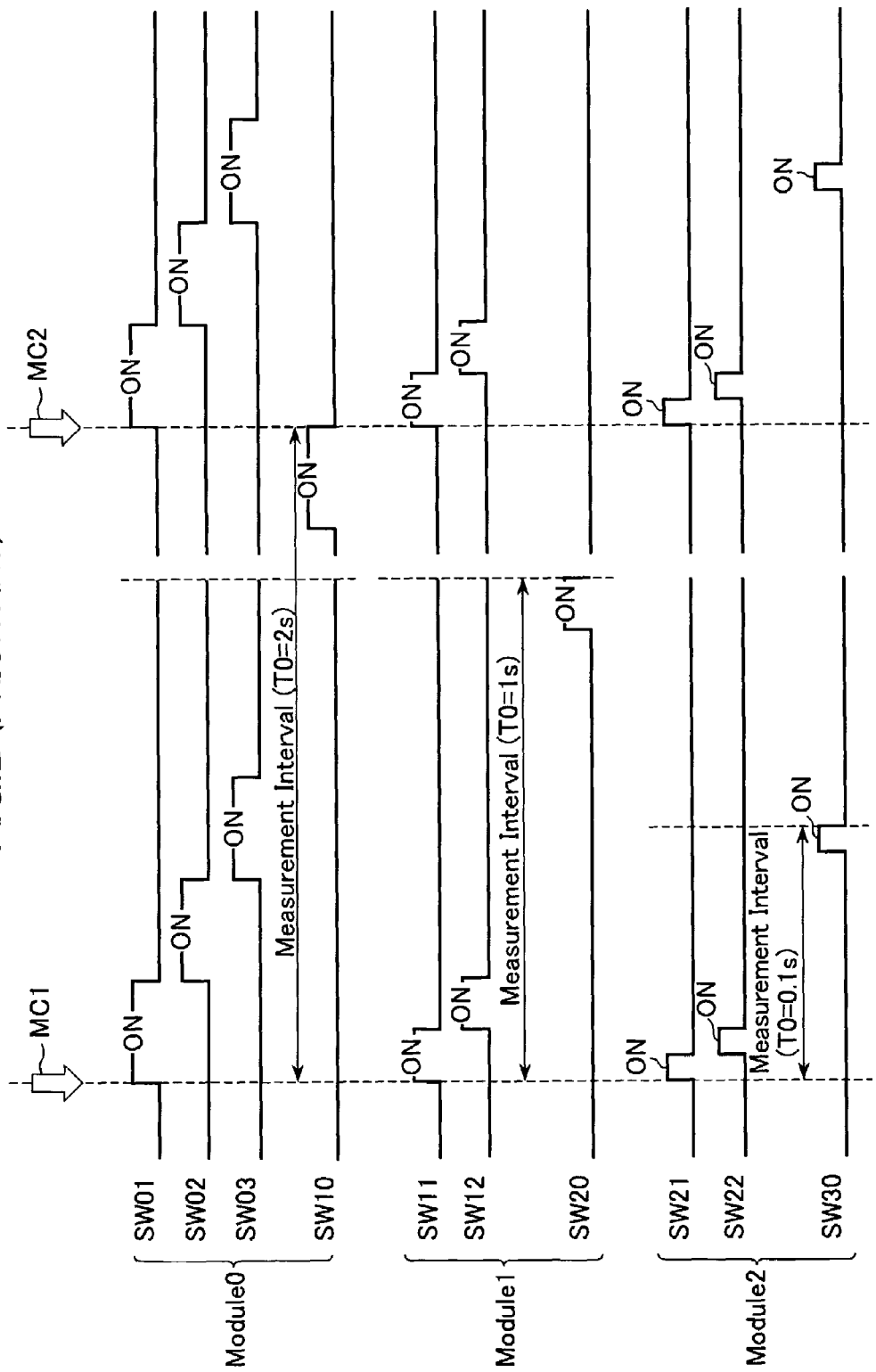
FIG. 2 is a timing chart explaining the operations in FIG. 1.

In FIG. 3, the following are connected to the main unit 10: the timer 11, main control 12, memory 13, command signal line 14, and module data arbitrator 15 in FIG. 1, and additionally a command memory 16 and command control 17.

The contents of the measurement sequence are saved to the command memory 16 prior to the start of measurement. Herein, a measurement sequence establishes which input module to send a measurement start command to in the timing for sending measurement start commands; i.e., whether or not to send a measurement start command to each input module. For example, the measurement interval of the input module 20, which has the slowest measurement interval, is set to a single cycle, and the main control 12 calculates the sequence determining what timing to use in that period in sending measurement start commands to input modules 30 and 40, which have shorter measurement intervals. The results are saved to the command memory 16, in a tabular format such as that shown in FIG. 4.

The command control 17 checks the contents of the measurement sequence stored in the command memory 16 at the measurement start command timing output from the main control 12; selects the input module to which a measurement start command is to be sent; and sends the measurement start command.

In the example of FIGS. 3 and 4, the measurement interval of the input module 20 is 2 seconds, so the main unit 10 sends a measurement start command only at the first of twenty measurements. The measurement interval for the input module 30 is 1 second, so the main unit 10 sends measurement start commands at the first and eleventh measurements. Lastly, the measurement interval of the input module 40 is 0.1 second, so the main unit 10 sends measurement start commands at each measurement.

Figure 5:
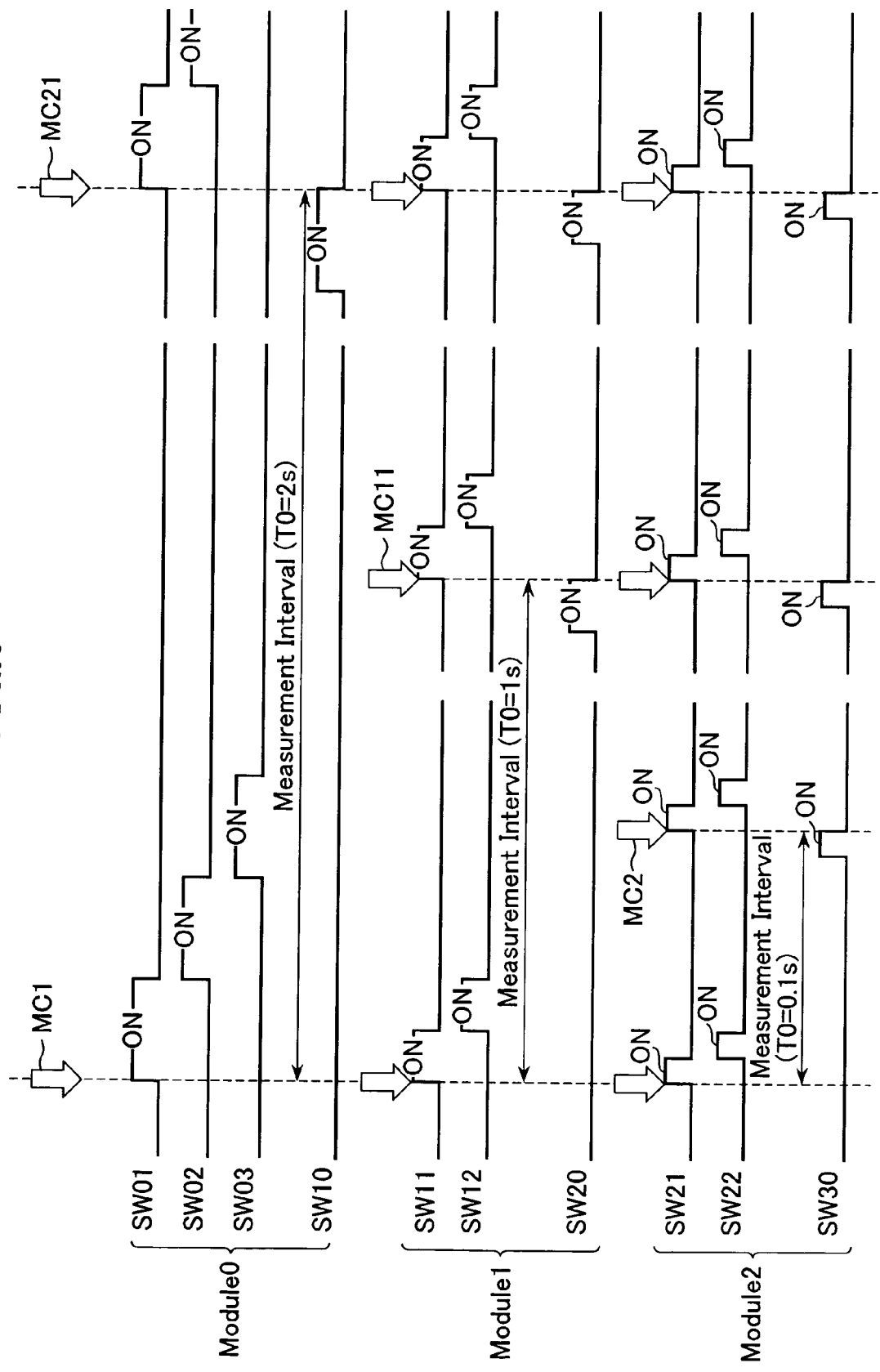
FIG. 5 is a timing chart explaining the operations in FIG. 3.

FIG. 5 is a timing chart illustrating the operations for the combination of FIGS. 3 and 4. The measurement start command MC1 for the first measurement is input to each of the input modules 20, 30 and 40. The switches of each of the input modules 20, 30 and 40 are sequentially and selectively driven one at a time. Specifically, switches SW01 through SW10 in input module 20 are sequentially and selectively driven at 2-second measurement intervals; switches SW11 through SW20 in input module 30 are sequentially and selectively driven at 1-second measurement intervals; and switches SW21 through SW30 in input module 40 are sequentially and selectively driven at 0.1-second measurement intervals.

The measurement start command MC2 for the second measurement is input only to input module 40 after its first measurement has ended. Switches SW21 through SW30 in input module 40 are sequentially and selectively driven at 0.1-second measurement intervals.

The measurement start command MC11 for the eleventh measurement is input to input module 30 after its first measurement has ended, and input module 40 after its tenth measurement has ended. Switches SW11 through SW20 in input module 30 are sequentially and selectively driven at 1-second measurement intervals; and switches SW21 through SW30 in input module 40 are sequentially and selectively driven at 0.1-second measurement intervals.

The measurement start command MC21 for the twenty-first measurement is input to input module 20 after its first measurement has ended, input module 30 after its second measurement has ended, and input module 40 after its twentieth measurement has ended. Switches SW01 through SW10 in input module 20 are sequentially and selectively driven at 2-second measurement intervals; switches SW11 through SW20 in input module 30 are sequentially and selectively driven at 1-second measurement intervals; and switches SW21 through SW30 in input module 40 are sequentially and selectively driven at 0.1-second measurement intervals.

Figure 6:
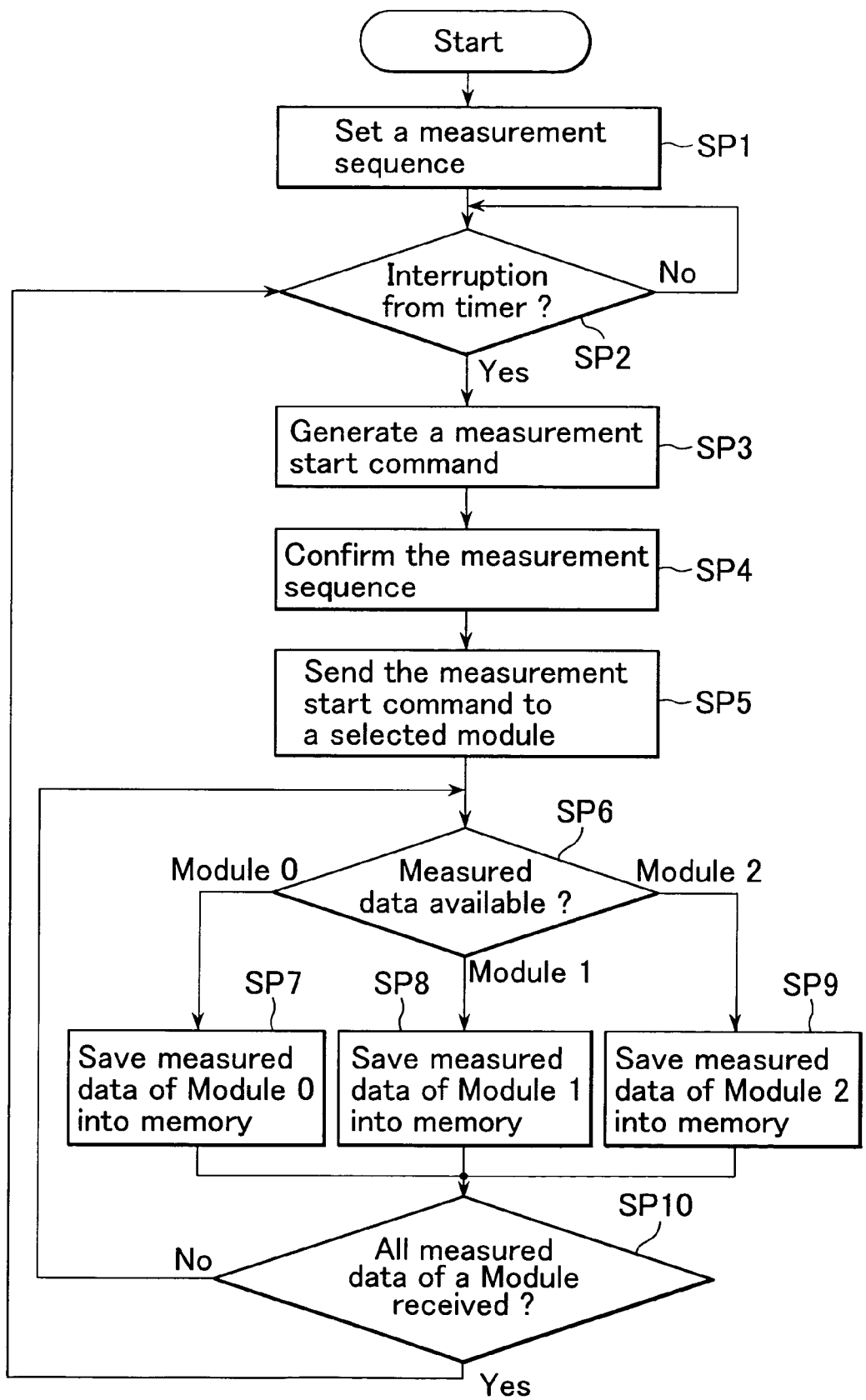
FIG. 6 is a flow chart explaining the operations of main unit 10 in FIG. 3.
Figure 7:
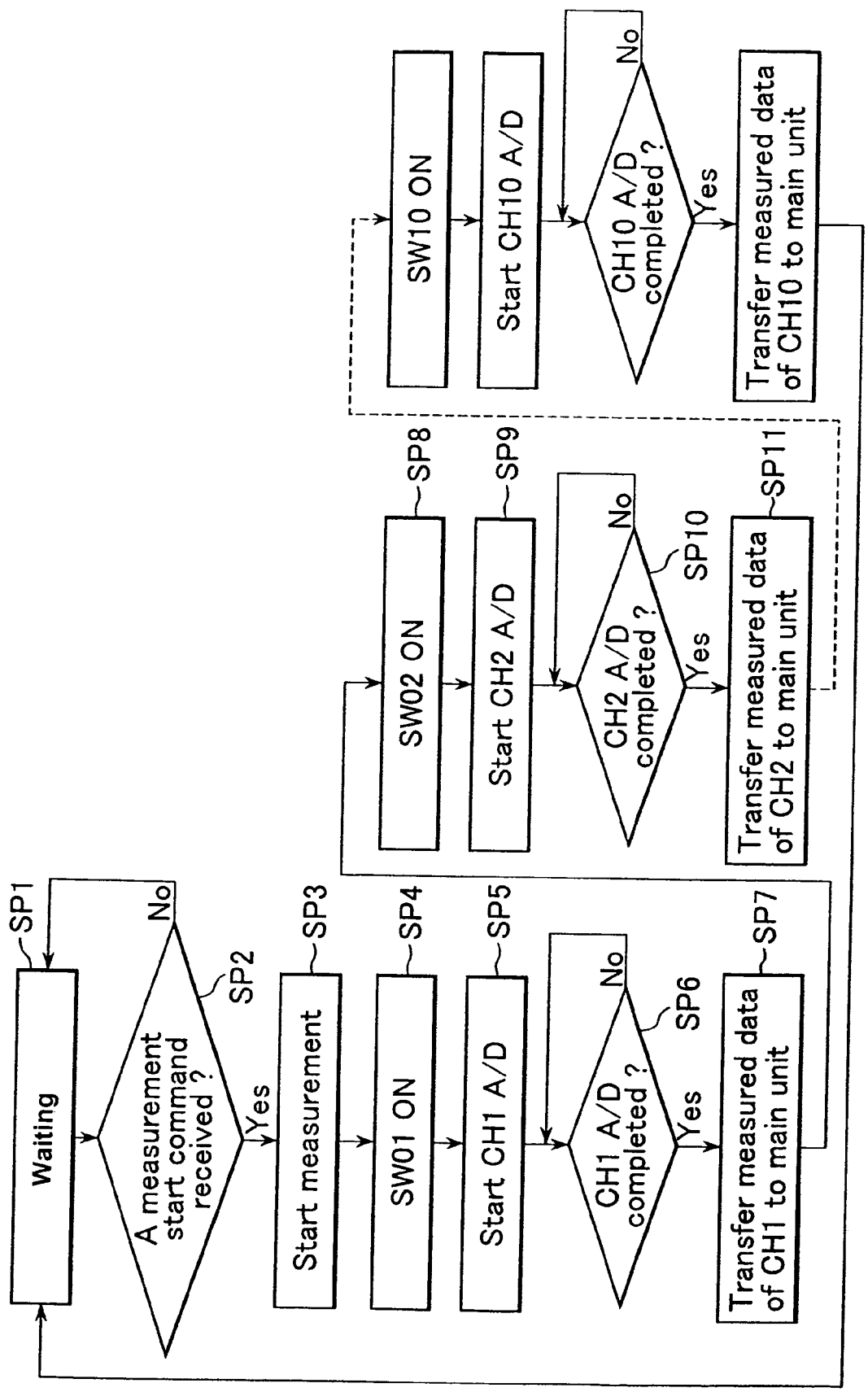
FIG. 7 is a flow chart explaining the operations of input module 20 in FIG. 3.

FIG. 6 is a flow chart explaining the operations of main unit 10. FIG. 7 is a flow chart explaining the operations of input module 20.

In FIG. 6, the main control 12 of the main unit 10 sets a measurement sequence based on the measurement sequence data saved in the command memory 16 (SP1).

Next, the main control 12 checks whether or not there is an interrupt from the timer 11 (SP2), and sends a measurement start command if there is an interrupt (SP3).

After recieving an measurement start command, the command control 17 checks the measurement sequence based on the measurement sequence data saved in the command memory 16 (SP4).

The command control 17 sends the measurement start command to the selected input module (SP5).

The module data arbitrator 15 checks whether or not there are measured data for each of the input modules 20, 30 and 40 (SP6). Next, the main control 12 stores the measured data of each of the input modules 20, 30 and 40 in the memory 13 (SP7–SP9).

The operations in these steps SP6-9 are repeated until the measured data of one of the input modules 20, 30 and 40 have been received. Once the measured data have been received, step SP2 is returned to, and the next measurement operation is executed (SP10).

In contrast, in FIG. 7, an input module such as 20 is in the measurement start command standby state (SP1). When a measurement start command is received (SP2), the measurement operation is started (SP3). First the switch SW01 is turned on (SP4), and A/D conversion is started on the analog measurement signal on measurement channel CH1 (SP5). Once analog conversion is completed (SP6), the measured data on measurement channel CH1 are transferred to the main unit 10 (SP7).

Next, the switch SW02 is turned on (SP8), and A/D conversion is started on the analog measurement signal on measurement channel CH2 (SP9). Once A/D conversion is completed (SP10), the measured data on measurement channel CH2 are transferred to the main unit 10 (SP11).

Subsequently, the same steps are repeated all the way through switch S10/measurement channel CH10, after which the measurement start command standby state is reentered (SP1).

With this type of configuration, it is possible to provide a single apparatus or system with multiple input modules having different measurement intervals, and measurement can be performed while sufficiently realizing the performance of the individual input modules, without the measurement intervals affecting each other.

Specifically, in the measurement of characteristics of a fuel cell system used in electric cars as mentioned above, measurements can be performed with the temperature change measurement interval for each part set to, for example, 2 seconds, while the voltage fluctuation measurement interval is set to, for example, 0.1 second.

In addition, if an integrating converter is used as the A/D converter, it is possible to select noise removal characteristics suitable for the measurement subject because different integration times can be set for each input module.

Figure 8:
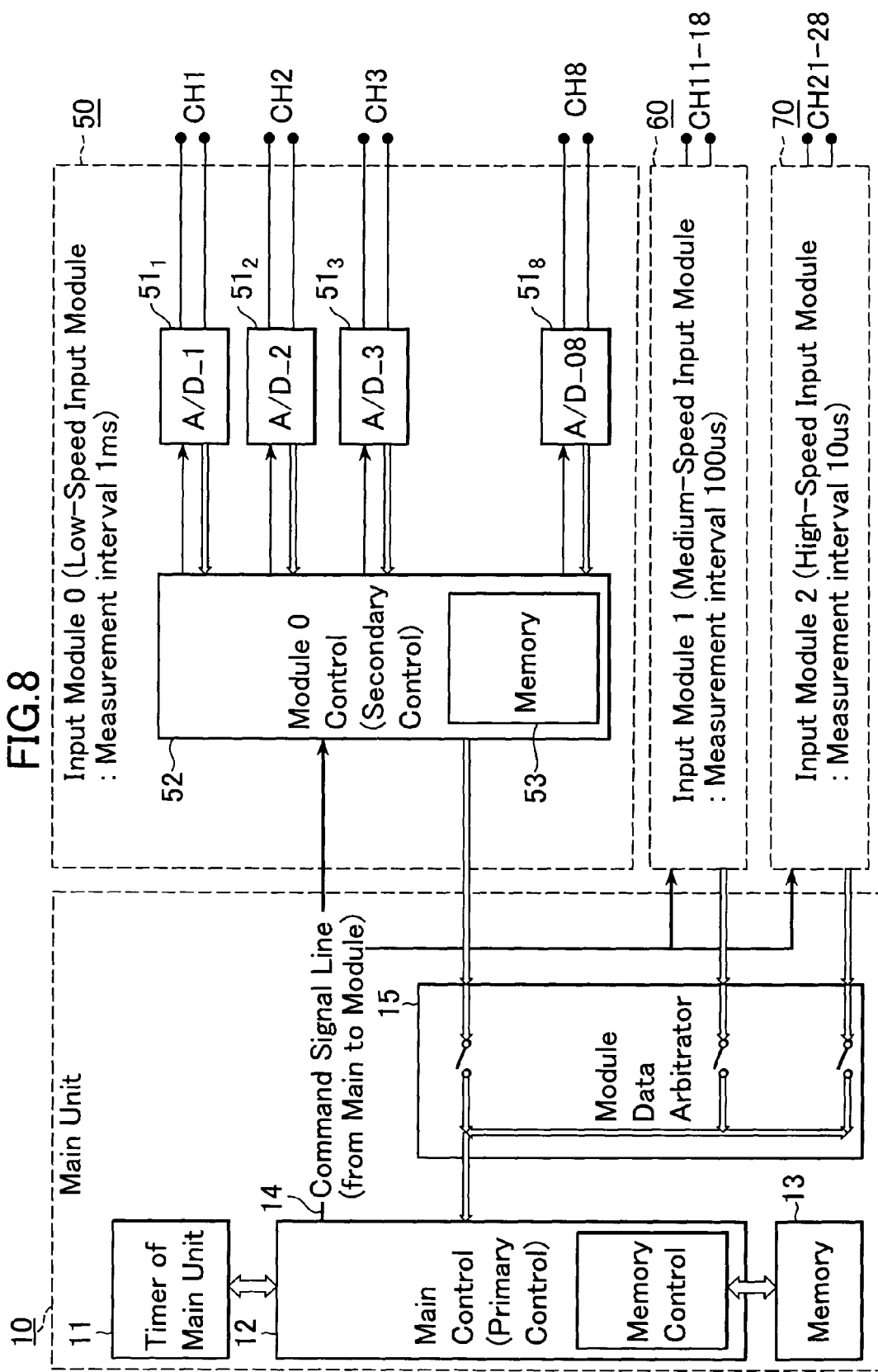
FIG. 8 is a block diagram illustrating another preferred embodiment of the present invention.

It should be noted that the above preferred embodiment describes a case in which a scanner and an integrating A/D converter are used; however, it is also permissible to provide, for example, successive approximation-type A/D converters $51^1$ through $51^8$ on the individual measurement channels CH1 through CH8 respectively, as shown in FIG. 8. In the example in FIG. 8, input module 50 is a low-speed module with a measurement interval of 1 ms; input module 60 is a medium-speed module with a measurement interval of 100 μs; and input module 70 is a high-speed module with a measurement interval of 10 μs.

Figure 9:
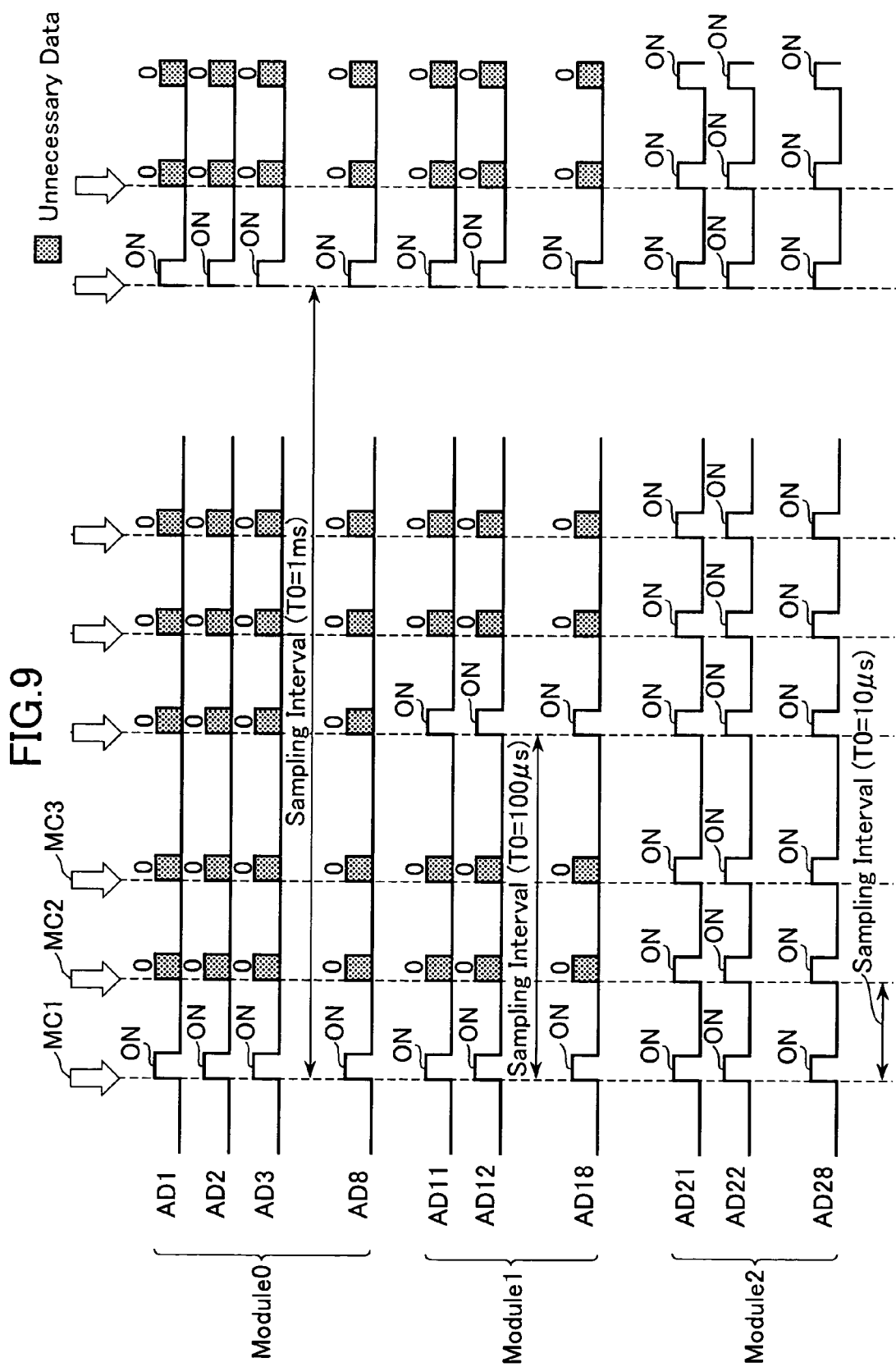
FIG. 9 is a timing chart explaining the operations in FIG. 8.

FIG. 9 is a timing chart which explains the operations in FIG. 8.

As shown in FIG. 9, measurements are performed on all of the input modules 50–70 in accordance with the input module 70 which has the shortest measurement interval (10 μs). All of the measured data are stored in the memories of the individual input modules (e.g., memory 53 for input module 50). After the measurements, the main control of each input module (e.g., main control 52 for input module 50) outputs to the main unit 10 just the data which are required in accordance with the set measurement interval. More specifically, input module 70 outputs all data; input module 60 outputs just one of ten data records because its measurement interval is 100 μs; and input module 50 outputs just one of one hundred data records because its measurement interval is 1 ms. In terms of data output, it is permissible to simply extract and output a single record; or to calculate the simple average value or the maximum occurrence value for the measured data in the applicable measurement interval and output the results; or to calculate and output a moving average of adjacent measurement intervals.

In FIG. 9, if just a single record is simply extracted and output, the A/D converter in particular would needlessly consume power, creating unneeded heat, because measurements would be performed even at times when measurements are not needed. In order to avoid this problem, timers for separately setting the measurement interval should be provided in each of the input modules, and driven so that measurements are performed according to the required measurement interval for each input module, as shown in FIG. 10.

Figure 10:
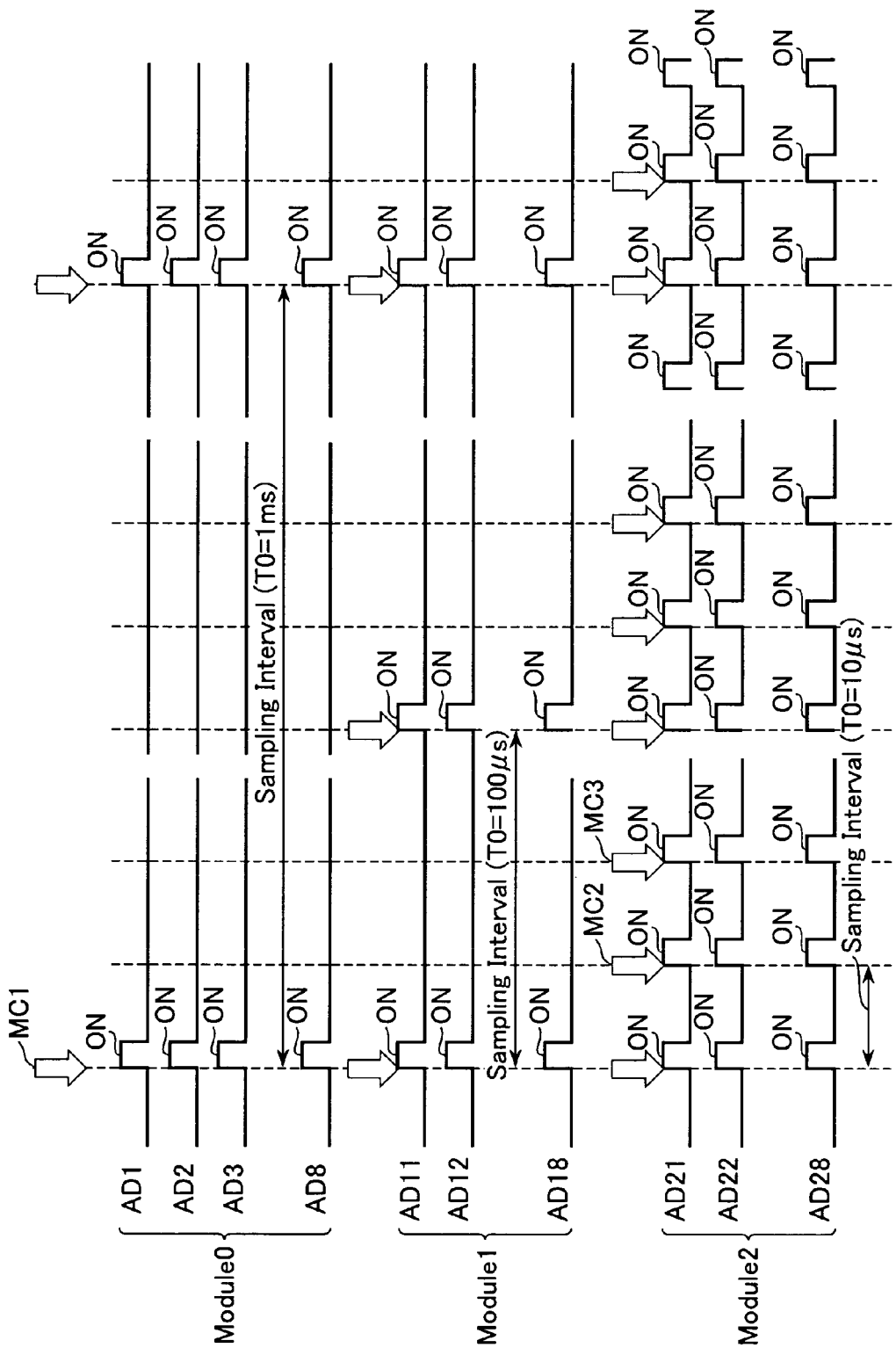
FIG. 10 is a timing chart explaining the operations in FIG. 8.

The provision of timers for separately setting measurement intervals in each input module as shown in the timing chart in FIG. 10 enables measurements based on measurement intervals matching the performance of each input module.

Figure 11:
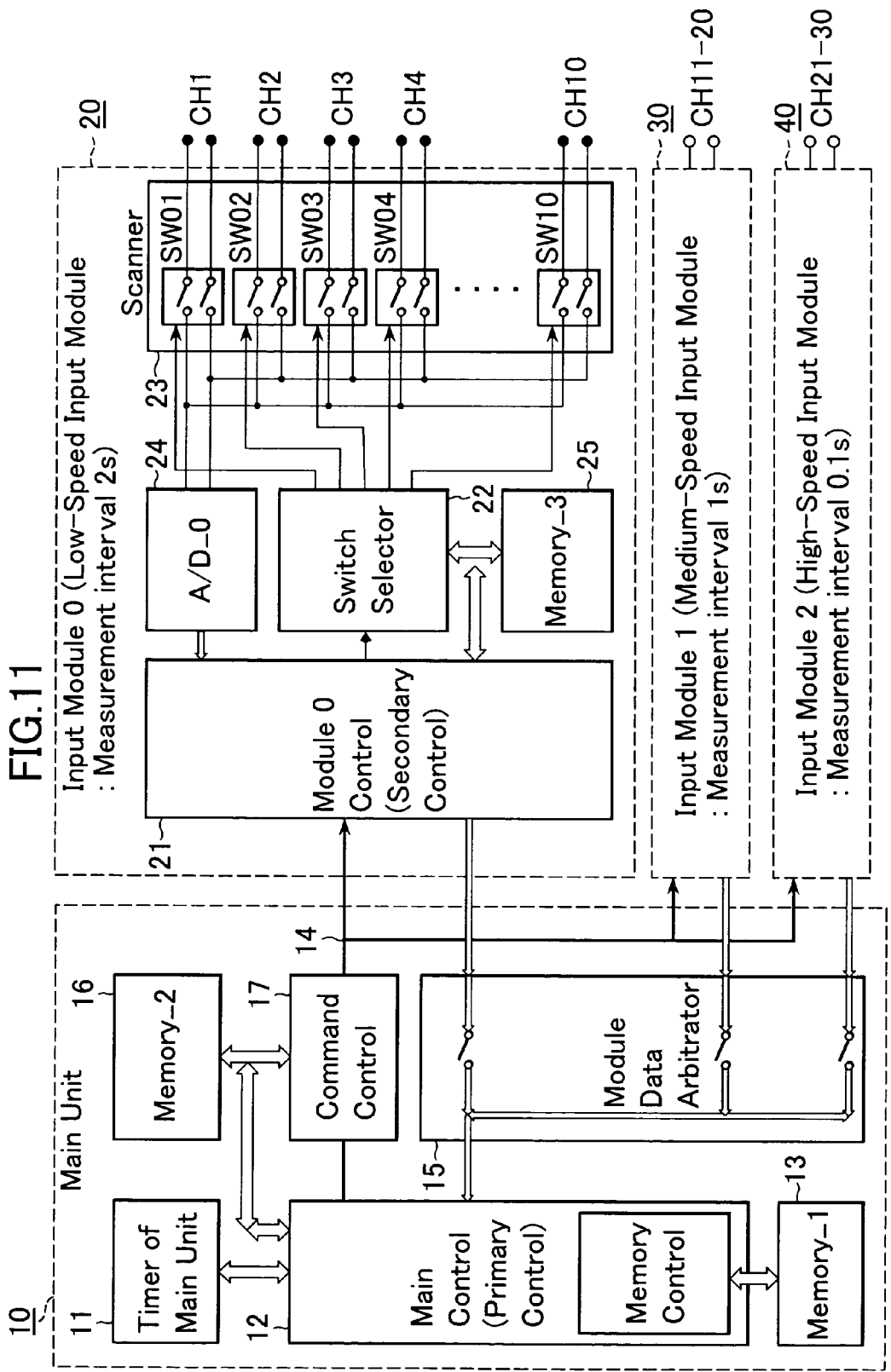
FIG. 11 is a block diagram illustrating another preferred embodiment of the present invention.

FIG. 11 is a block diagram showing another preferred embodiment of the present invention. Parts which are the same as in FIG. 3 are denoted by the same numbers. In FIG. 11, the command memory 16 and command control 17 of the main unit 10 control the measurement sequences of input modules 20, 30 and 40.

In this case, each of the input modules 20, 30 and 40 incorporates a function to control the measurement channel on which measurement is to be executed. Specifically, prior to the start of measurement, information on the measurement sequence for switches SW01 through SW10 is saved to the memory 25 of, for example, input module 20 from the main unit 10. After measurement starts, the module control 21 and switch selector 22 selectively drive the appropriate switch so as to perform measurement on the specified measurement channel while referencing the information in the measurement sequence saved in the memory 25, at the point in time when a measurement start command is received. Likewise, information on the measurement sequence for switches SW11 through SW20 is saved to the memory of input module 30 (not shown), and information on the measurement sequence for switches SW21 through SW30 is saved to the memory of input module 40.

This makes it possible to simultaneously drive the individual input modules using the optimal measurement intervals to sufficiently realize their respective capabilities, and to perform simultaneous measurement at different measurement intervals according to the measurement subject, even in cases where there is a mixture of multiple input modules with different measurement intervals.

Figure 12:
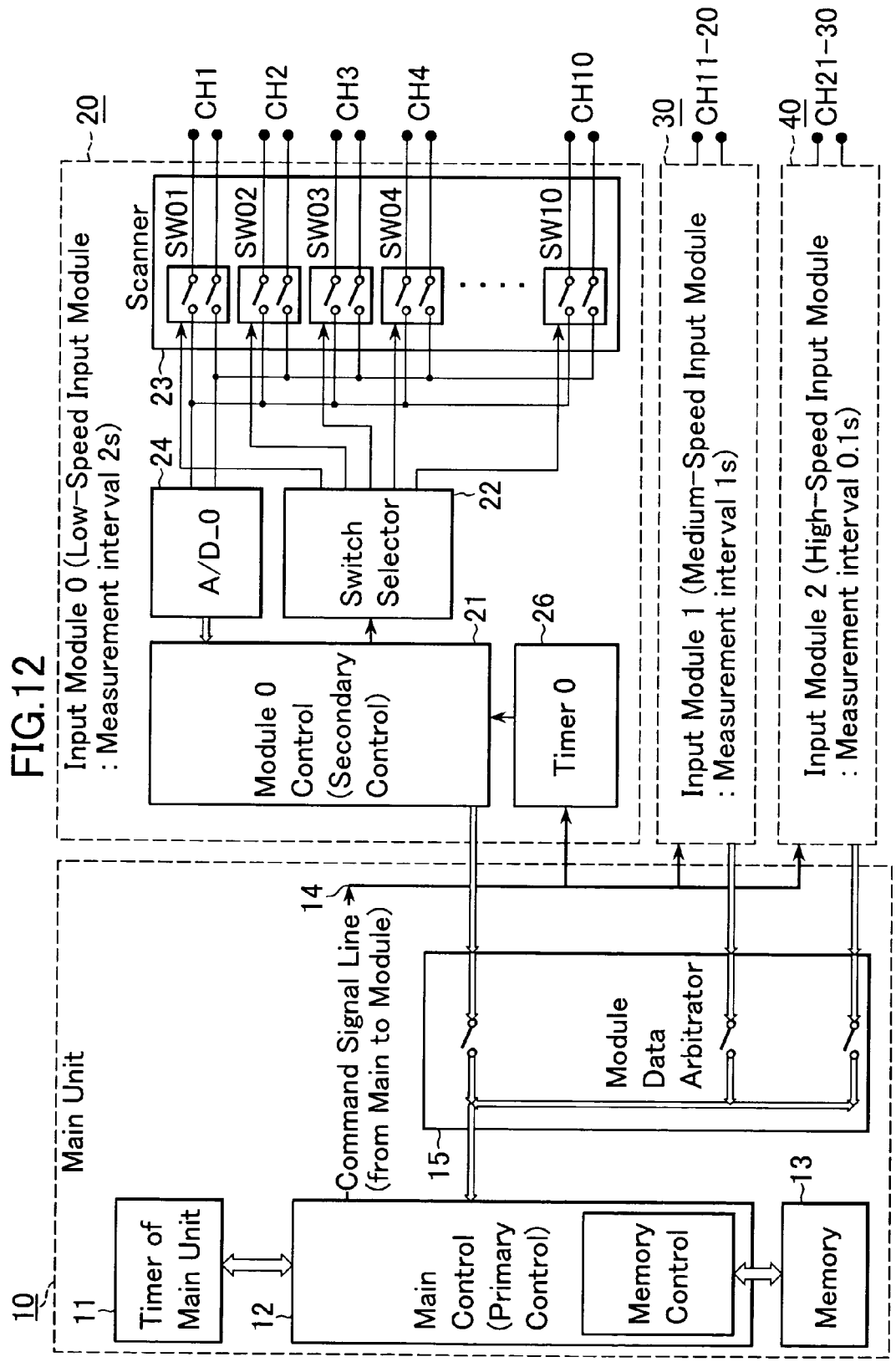
FIG. 12 is a block diagram illustrating another preferred embodiment of the present invention.

FIG. 12 is likewise a block diagram illustrating another preferred embodiment of the present invention. Parts which are the same as in FIG. 1 are denoted by the same numbers and excluded from the description. In FIG. 12, timers for determining the times for performing measurement at independent measurement intervals within each input module are provided in each of the input modules 20, 30 and 40. FIG. 12 shows a timer 26 in the input module 20. These timers function as timing circuits, which are a control means for outputting sampling timing signals of the prescribed interval based on a measurement start command which is common for all input modules.

Figure 13:
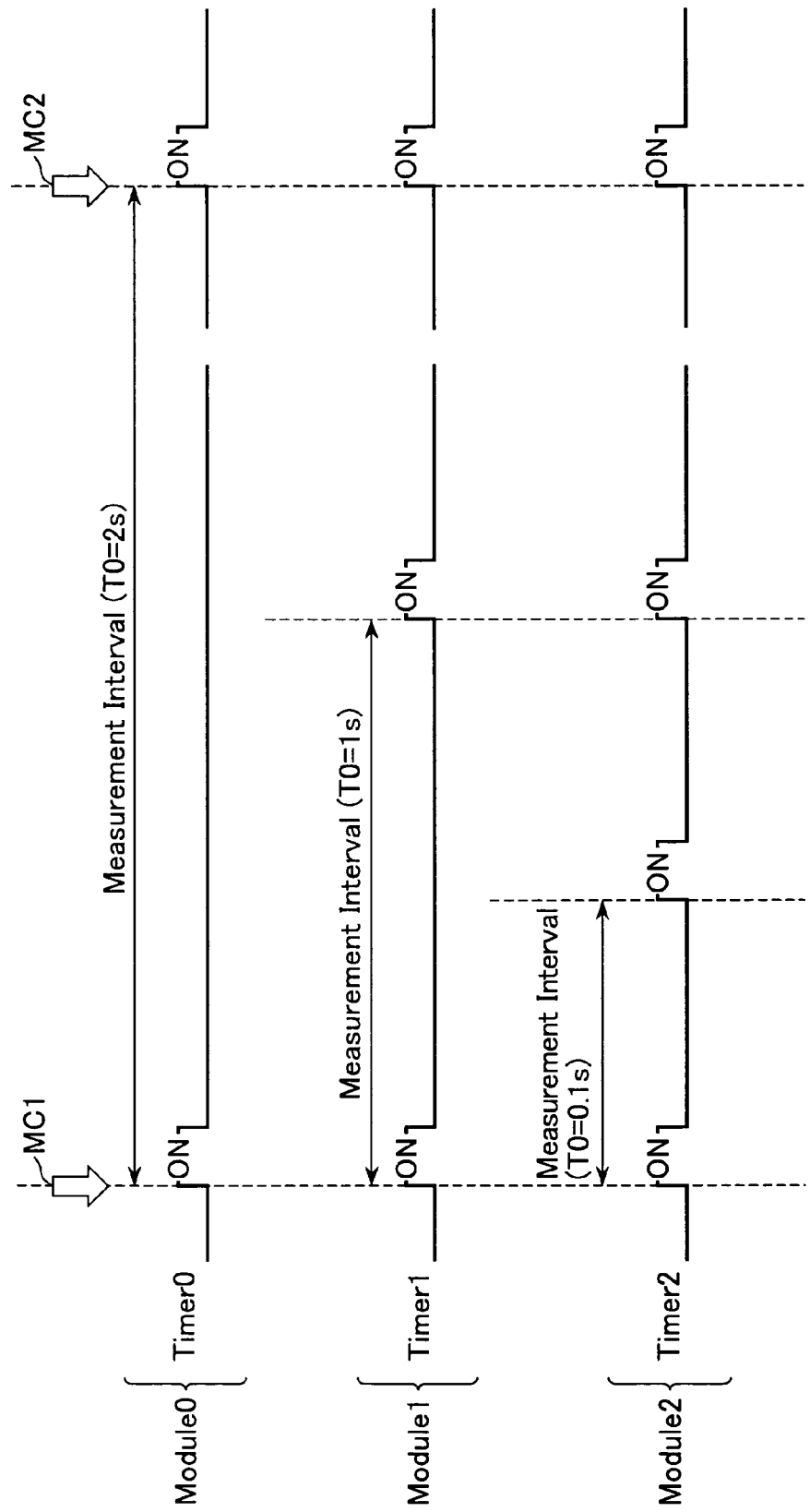
FIG. 13 is a timing chart explaining the operations in FIG. 12.

The interval for output signals of the timers provided in each of the input modules 20, 30 and 40 is set to match the measurement interval for the apparatus as a whole (the slowest measurement interval among the input modules), when divided as shown in FIG. 13. The timer of the input module 20 outputs a signal with a measurement interval of 2 seconds; the timer of the input module 30 outputs a signal with a measurement interval of 1 second; and the timer of the input module 40 outputs a signal with a measurement interval of 0.1 second.

Figure 14:
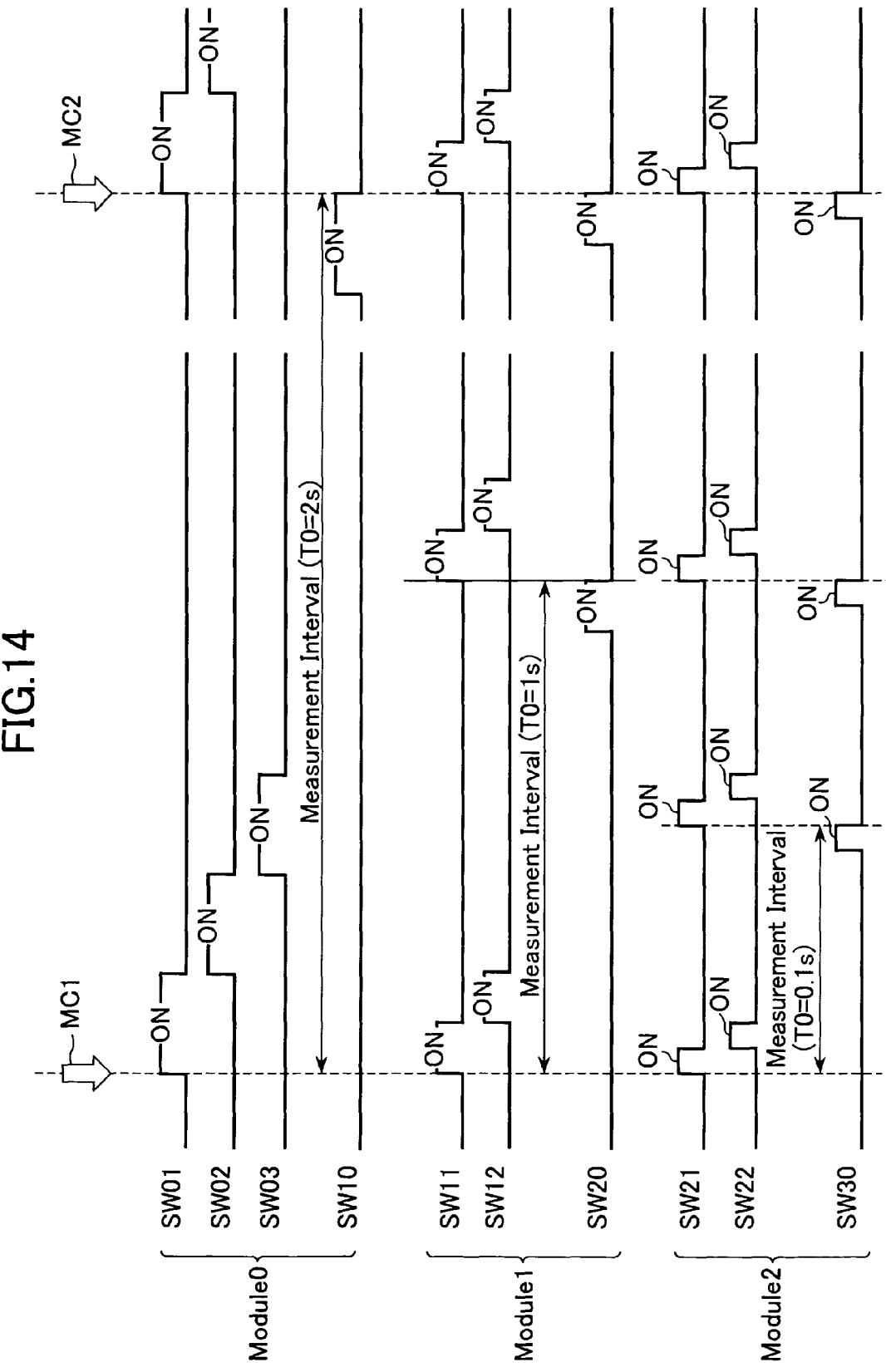
FIG. 14 is a timing chart explaining the operations in FIG. 12.

For the apparatus as a whole, as shown in FIG. 14, after a measurement start command MC is received, each timer starts signal output and outputs a clock pulse corresponding to a prescribed division. After the prescribed number of clock pulses is output, the standby state is entered, resulting in a non-output state, until the next measurement start command is received. Each of the input modules 20, 30 and 40 repeats clock pulse outputting each time a measurement start command MC is received.

Figure 15:
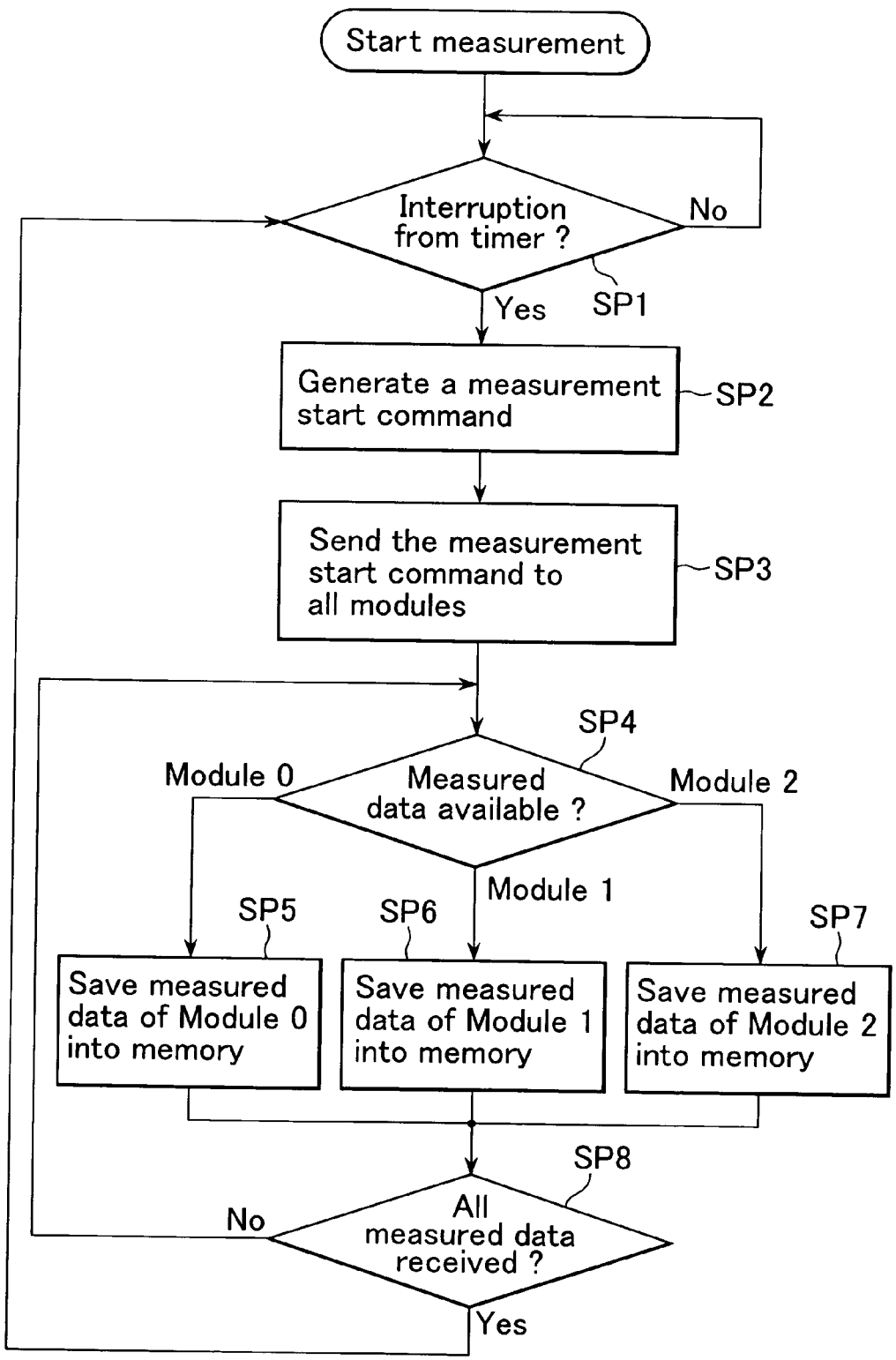
FIG. 15 is a flow chart explaining the operations of main unit 10 in FIG. 12.
Figure 16:
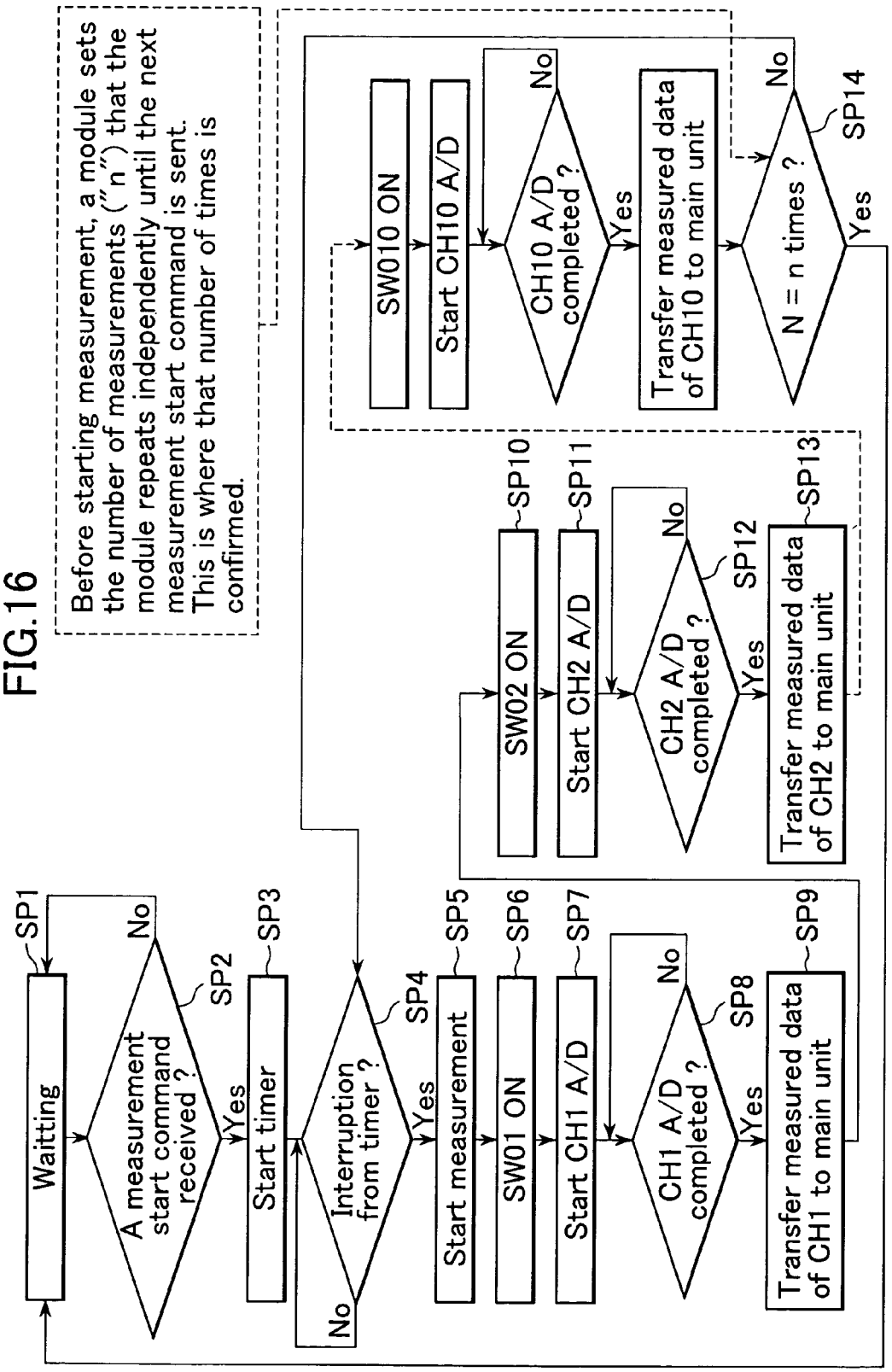
FIG. 16 is a flow chart explaining the operations of input module 20 in FIG. 12.

FIG. 15 is a flow chart which explains the operations of the main unit 10 in FIG. 12. FIG. 16 is a flow chart which explains the operations of the input module 20 in FIG. 12.

In FIG. 15, the main control 12 of the main unit 10 checks whether or not there is an interrupt from the timer 11 (SP1), and sends a measurement start command if there is an interrupt (SP2). Consequently, a measurement start command MC is sent to each of the input modules 20, 30 and 40 (SP3).

The main control 12 determines whether or not there are measured data for each of the input modules 20, 30 and 40 (SP4). Next, the main control 12 stores the measured data for each of the input modules 20, 30 and 40 in the memory 13 (SP5–7).

The operations in these steps SP4–7 are repeated until all measured data have been received. Once all measured data have been received, step SP1 is returned to, and the next measurement operation is executed (SP8).

In contrast, in FIG. 16, the timer 26 of an input module such as 20 is in the measurement start command standby state (SP1). When a measurement start command is received (SP2), the timer 26 starts (SP3). Next, the module control 21 of the input module 20 checks or not there is an interrupt from the timer 26 (SP4), and if there is an interrupt starts measurement (SP5), first turning on the switch SW01 (SP6). Consequently, A/D conversion is started on the analog measurement signal on measurement channel CH1 (SP7). Once A/D conversion is completed (SP8), the measured data on measurement channel CH1 are transferred to the main unit 10 (SP9).

Next, the switch SW02 is turned on (SP10), and A/D conversion is started on the analog measurement signal on measurement channel CH2 (SP11). Once A/D conversion is completed (SP12), the measured data on measurement channel CH2 are transferred to the main unit 10 (SP13).

Subsequently, the same steps are repeated all the way through switch S10/measurement channel CH10. Note that if a setting is made is advance for the number of times (n) measurement is repeated independently in an input module in the interval up to the next transmitted measurement start command, that number of times N is checked once the measurement for switch S10/measurement channel CH10 has been completed (SP14). The processes from SP4 onward are repeated until the prescribed number of times N is reached. When the prescribed number of times N is reached, the measurement start command standby state is reentered (SP1).

With this type of configuration, as in FIG. 3, it is possible to provide a single apparatus or system with multiple input modules having different measurement intervals, and measurement can be performed while sufficiently realizing the performance of the individual input modules, without the measurement intervals affecting each other.

Consequently, in the measurement of characteristics of a fuel cell system used in electric cars as mentioned above, measurements can be performed with the temperature change measurement interval for each part set to, for example, 2 seconds, while the voltage fluctuation measurement interval is set to, for example, 0.1 second.

In addition, if an integrating converter is used as the A/D converter, it is possible to select noise removal characteristics suitable for the measurement subject because different integration times can be set for each input module.

Although FIG. 12 describes a case in which a scanner and integrating A/D converter are used, it is also permissible to provide successive approximation-type A/D converters as in FIG. 8.

In addition, the A/D converters used in each input module simply need to be of the same type at least within the input modules. It is permissible to have a combination using an integrating type in a relatively low-speed input module, while using a successive approximation type in a medium-speed input module and using a Δ-S type in a high-speed input module.

As described above, according to the present invention, it is possible to perform simultaneous data acquisition using multiple measurement intervals which are optimal for each input module in a data acquisition apparatus comprised of multiple input modules. This is well suited to a variety of data acquisition apparatuses, such as those used in measuring the characteristics of fuel cell systems used in electric cars.

What is claimed is:

1. A data acquisition apparatus, comprising multiple input modules having different measurement intervals, wherein said data acquisition apparatus is characterized in that a control means is provided for simultaneously driving each input modules at a desired measurement interval; a measurement start command transmission control means, which selectively sends measurement start commands to the individual input modules, is provided as a control means; and the measurement start command transmission control means is a memory, which stores in tabular format the input modules to which measurement start commands are to be sent in the measurement start command transmission timing.

2. The data acquisition apparatus described in claim 1, characterized in that each input module has multiple measurement channels.

3. The data acquisition apparatus described in claim 2, characterized in that the measurement interval for each measurement channel in each input module differs based on the measurement start command.

4. The data acquisition apparatus described in claim 1, characterized in that a timing circuit, which outputs a sampling timing signal of a prescribed interval based on a common measurement start command, is provided as a control means to each input module.

5. The data acquisition apparatus described in claim 4, characterized in that each input module has multiple measurement channels.

6. The data acquisition apparatus described in claim 5, characterized in that the measurement interval for each measurement channel in each input module is different.

* * * * *